United States Patent
Fina et al.

[11] Patent Number: 6,033,452
[45] Date of Patent: Mar. 7, 2000

[54] XEROGRAPHIC CUSTOMER REPLACEABLE UNIT FILTER AND ASSEMBLY METHOD

[75] Inventors: Eugene J. Fina; Andrij Harlan, both of Rochester, N.Y.

[73] Assignee: Xerox Corporation, Stamford, Conn.

[21] Appl. No.: 09/047,727

[22] Filed: Mar. 25, 1998

[51] Int. Cl.[7] .................................................. B01D 46/10
[52] U.S. Cl. .......................... 55/385.1; 55/493; 55/497; 55/511; 55/514; 55/529; 399/110; 399/111
[58] Field of Search .................... 55/385.1, 518, 55/529, 471, 472, 493, 497, 511, 514; 399/110, 113, 119, 121, 123, 111; 361/230

[56] References Cited

U.S. PATENT DOCUMENTS

| | | | |
|---|---|---|---|
| 3,552,103 | 1/1971 | Smith | 55/529 |
| 4,333,752 | 6/1982 | Thies et al. | 55/518 |
| 4,802,900 | 2/1989 | Ball et al. | 55/385.1 |
| 4,938,786 | 7/1990 | Tonomoto . | |
| 5,021,831 | 6/1991 | Tonomoto . | |
| 5,170,211 | 12/1992 | Haupt et al. . | |
| 5,269,824 | 12/1993 | Takita | 55/385.1 |
| 5,270,731 | 12/1993 | Kerr et al. . | |
| 5,379,506 | 1/1995 | Park . | |
| 5,527,569 | 6/1996 | Hobson et al. . | |
| 5,557,386 | 9/1996 | Meguro et al. . | |
| 5,568,230 | 10/1996 | Reddy et al. . | |
| 5,612,768 | 3/1997 | Kim et al. . | |
| 5,787,322 | 7/1998 | Sais et al. | 399/110 |
| 5,809,375 | 9/1998 | Owens, Jr. et al. | 399/110 |
| 5,812,359 | 9/1998 | Gross et al. | 361/230 |
| 5,851,250 | 12/1998 | Sugie et al. | 55/529 |

*Primary Examiner*—David A. Simmons
*Assistant Examiner*—Minh-Chau T. Pham
*Attorney, Agent, or Firm*—John S. Wagley; Andrew D. Ryan

[57] ABSTRACT

A filter in a printing machine traps contaminants from a stream of air passing therethrough. The filter includes a support member defining an aperture therethrough for the passage of the stream of air. The support member has a cross section in a plane perpendicular to the flow of the stream of air. The cross section has an oblong shape and includes a longitudinal axis and a transverse axis. The filter further includes an air permeable member supported by the support member. The air permeable member defines a opening therein for receiving the stream of air. The filter further includes a reinforcement connected to the air permeable member. The reinforcement extends along the air permeable member in the direction of the stream of air. The reinforcement is positioned with respect to the support member so as to shape the air permeable member so that the opening may be sufficiently large to efficiently receive the stream of air.

21 Claims, 5 Drawing Sheets

XEROGRAPHIC CUSTOMER REPLACEABLE UNIT FILTER AND ASSEMBLY METHOD

BACKGROUND OF THE INVENTION

This invention relates generally to a customer replaceable unit (CRU) for a printing machine, and more particularly concerns a xerographic module for an electrophotographic printing machine.

In a typical electrophotographic printing process, a photoconductive member is charged to a substantially uniform potential so as to sensitize the surface thereof. The charged portion of the photoconductive member is exposed to a light image of an original document being reproduced. Exposure of the charged photoconductive member selectively dissipates the charges thereon in the irradiated areas. This records an electrostatic latent image on the photoconductive member corresponding to the informational areas contained within the original document. After the electrostatic latent image is recorded on the photoconductive member, the latent image is developed by bringing a developer material into contact therewith. Generally, the developer material comprises toner particles adhering triboelectrically to carrier granules. The toner particles are attracted from the carrier granules to the latent image forming a toner powder image on the photoconductive member. The toner powder image is then transferred from the photoconductive member to a copy sheet. The toner particles are heated to permanently affix the powder image to the copy sheet.

In printing machines such as those described above, a CRU is a customer replaceable unit which can be replaced by a customer at the end of life or at the premature failure of one or more of the xerographic components. The CRU concept integrates various subsystems whose useful lives are predetermined to be generally the same length. The service replacement interval of the CRU insures maximum reliability and greatly minimizes unscheduled maintenance service calls. Utilization of such a strategy, allows customers to participate in the maintenance and service of their copiers/printers. CRUs insure maximum up time of copiers and minimize downtime and service cost due to end of life or premature failures.

It is desirable to have a CRU that enables a variety of machine subsystems to be incorporated into a single unit while maximizing the useful life of each component. It is further desirable to utilize a CRU that allows service to a machine to be performed efficiently and at a relatively low cost and in some cases to be serviced by the user himself. It is a further benefit to have the ability to reuse and recycle various CRU components in today's climate of environmental awareness.

It is important that customer replaceable units be customer friendly. In other words, it is important that the CRUs may be easily removed and reinstalled with minimal instructions and minimal training. Unfortunately, the CRUs typically include a number of items that are critical to the proper operation of the machine, e.g. charging devices, photoreceptors and developer subsystems. These components and subsystems are very delicate and need to be properly handled and to not be damaged during the installation and removal of the CRUs. CRUs, particularly xerographic CRUs, typically include toner, e.g. waste toner or new toner. Access must be had between a waste toner reclaim bottle and the cleaning portion of the xerographic CRU. During removal and transportation of a CRU, it is important that the toner stored within a toner supply source or a toner waste bottle be properly secured. Waste toner bottles as well as new toner bottles typically include seals and/or covers to prevent the inadvertent spilling of toner into the CRU. The customer must properly position such seals or doors during CRU installation and removal.

The cleaning or removal of excess toner from the photoconductive member in a printing machine is typically handled by a cleaning blade. The photoconductive member is typically very delicate and may easily be damaged by the cleaning blade. CRUs that must be separated from a photoconductor during assembly and removal require that the cleaning blade be moved in a position away from the CRU prior to removal of the CRU. The critical alignment and positioning of components within a CRU for the respectively removal and installation of the CRU make the CRU installation and removal process difficult for an untrained customer.

Electrophotographic printing and copying machines are very susceptible to airborne contamination within the printing machine. For example, airborne contamination may damage intricate electronic components, i.e. the charge corotron and other corotrons within the printing machine, interfere with the quality of the copy in the exposure and development station and generally cause copy quality and reliability problems within the printing machine. These problems are exacerbated by the cleaning of the photoconductive surface which must be performed as part of the xerographic process. The cleaning of the photoconductive surface may cause components, in particular marking particles in the form of toner, to become airborne within the printing machine.

Attempts have been made to remove the airborne dust or toner within the internal portion of the printing machine. For example, air permeable filters have been used in conjunction with motor driven fans and conduits to positively direct a flow of air within the printing machine through a filter media so that the contamination may be trapped within the filter. In order to permit the passage of air through the filter, the filter media is made of a lightweight weak material which usually can not adequately support itself.

The internal portion of the filter into which the flow of air is directed has a tendency to collapse or to not be fully open thereby decreasing the effectiveness of the filter. A support structure may be positioned within the filter opening to assure that the filter is adequately opened and in proper orientation to provide for effective air flow. This inner structure reduces the exposed area of the filter reducing its efficiency. Further, this internal structure may add cost to the filter and make recycling of the filter media more complicated.

The filter after collecting sufficient airborne toner may become clogged. The clogged filter may require replacement. The filter may be separately replaced or as has become more recent practice, be combined with other customer replaceable components into a customer replacement unit or CRU which has a scheduled regular replacement period to assure maximum efficient machine utilization.

The following disclosures may relate to various aspects of the present invention.

U.S. Pat. No. 5,612,768
Patentee: Kim
Issue Date: Mar. 18, 1997

U.S. Pat. No. 5,568,230
Patentee: Reddy et al.
Issue Date: Oct. 22, 1996

U.S. Pat. No. 5,557,386
Patentee: Meguro et al.
Issue Date: Sep. 17, 1996

U.S. Pat. No. 5,527,569
Patentee: Hobson et al.
Issue Date: Jun. 18, 1996

U.S. Pat. No. 5,379,506
Patentee: Park
Issue Date: Jan. 10, 1995

U.S. Pat. No. 5,270,731
Patentee: Kerr et al.
Issue Date: Dec. 14, 1993

U.S. Pat. No. 5,170,211
Patentee: Haupt et al.
Issue Date: Dec. 8, 1992

U.S. Pat.No. 5,021,831
Patentee: Tonomoto
Issue Date: Jun. 4, 1991

U.S. Pat. No. 4,938,786
Patentee: Tonomoto
Issue Date: Jul. 3, 1990

Some portions of the foregoing disclosures may be briefly summarized as follows:

U.S. Pat. No. 5,612,768 discloses an image forming apparatus having an air flow structure capable of generating an airflow along a direction substantially perpendicular to a photosensitive drum through a charging device in order to prevent contamination of a corona wire (i.e., discharge wire). The image forming apparatus constructed according to the principles of the present invention includes a main frame having parallel side walls with a side wall having an air intake port. A cover is pivotally connected at one end of said main frame so as to allow closing and opening of the image forming apparatus and an image carrier is installed in the main frame so as to form a latent image. A ventilation fan installed at the port in the side wall generates an air flow through an air duct installed to guide the air flow. A charging device positioned in parallel with the image carrier when the cover is closed so as to charge a surface of the image carrier for forming the latent image, includes a corona wire extending in a direction of the image carrier for performing charging operation in response to application of a voltage, and a shield case for protecting the corona wire and having at least one opening receiving air flowing from the duct and allowing the air to flow through the corona wire so as to prevent contamination of the wire.

U.S. Pat. No. 5,568,230 discloses a corona generator including a support structure and an electrode mounted on the support structure is provided. The corona generator also includes an ozone neutralizing element removably mounted on the support structure proximate to the electrode. The ozone neutralizing element has various substrates and types for removably mounting the element.

U.S. Pat. No. 5,557,386 discloses a toner recovering device for an electrophotographic apparatus, which includes: a dust collector connected to a device for cleaning untransferred toner remaining on a photosensitive body; a toner recovering filter having an inlet port for introducing an air-toner mixture from the dust collector side and an exhaust port for filtering the air-toner mixture and discharging the air from which the toner has been removed; a filter mounting section for mounting the toner recovering filter; a joint mechanism having a joint and a hose member, one end of the hose member capable of being connected to the dust collector and other end thereof being joint, the joint being disposed at the inlet port, the joint mechanism being arranged in the filter mounting section in such a manner as to be opened and closed; a detector for sensing that the toner recovering filter has been mounted or not onto the filter mounting section; and a pulling member for coupling the inlet port of the toner recovering filter to the joint in synchronism with an operation of mounting the toner recovering filter onto the filter mounting section.

U.S. Pat. No. 5,527,569 discloses an improved electrically conductive filter media particularly suitable for use in applications where static electricity must be dissipated. The filter media of the present invention comprises a microporous filtration layer having electrically conductive particles embedded therein. When attached to support media, this structure provides exceptional filtration efficiency while assuring a consistent and evenly distributed electrical pathway to ground.

U.S. Pat. No. 5,379,506 discloses a process and device enabling easy and reliable placement of an ozone filter from and into a frame member of an electrophotographic apparatus. The device uses a pair of slots formed on both sides of a filter mounting recess and a filter holder which includes, as a unit, a portion provided with the ozone filter, a pair of tension members with raised edges for engaging with the pair of slots to affix the filter holder within the filter mounting recess when the filter holder is inserted into the filter mounting recess, and grip members for handling the filter holder. Grip members, when pressed towards each other, produce a tension and allow the filter holder to be quickly and easily removed from or inserted into the filter mounting recess.

U.S. Pat. No. 5,270,731 discloses an imaging system comprising a source of light movable with respect to a writing element and projectable thereon to generate an image, a focusing system is provided for focusing a light source which generates a first beam of light of a wavelength selected to be actinic with respect to the writing element. At least a portion of the first beam of light is absorbed by the writing element. The apparatus comprises a material feeder to automatically supply donor sheets and receiver sheets independently to a writing platen or drum, and to selectively load and unload the donor sheets from superposition with the receiver sheet without disturbing the registration of the receiver sheet. Also included are components which contribute to the quality of the images generated, such as relatively inexpensive, low jitter transports and drives for the writing head and imaging drum. In particular, the positive air flow through the apparatus is carefully directed to prevent contamination of the image by air-borne dirt.

U.S. Pat. No. 5,170,211 discloses a copying apparatus which includes a filtering system defining an inlet and an outlet to the corotron cavity. Both the inlet and the outlet include filter material for filtering the air before it is delivered to the corotron cavity and filtering effluents generated during actuation of scorotron wires. The pathways to the inlet and the scorotron cavity are sealed to ensure little or no leakage of contaminated air which could be exposed to the scorotron wires. For this purpose two activated charcoal filters are doped with silver on a foam substrate, utilized both for the inlet and the outlet filters.

U.S. Pat. No. 5,021,831 discloses an electrophotographic/electrostatic recording apparatus especially for high speed recording, a toner image on a recording sheet is fused thereon by a flash lamp in a fixing unit, and smoke is generated thereby. Smoke and toner dust in the ambient air should be removed before it is exhausted out of the apparatus by drawing the air through an air filter. The invention discloses that is it effective to use an air filter structure comprising a plurality of filter units, wherein a first filter unit made of electrostatically charged fibrous material is utilized at the inlet side of the air filter. The first filter unit has a comparatively greater porosity and attracts and removes toner particles charged with the opposite polarity to that of the electrostatically charged fibrous material. Therefore, the air, a substantial part of toner dust being removed therefrom, can more easily enter into the following filter units for removal of smoke, resulting in increased endurance of the air filter.

U.S. Pat. No. 4,938,786 discloses an air filter structure is described including a plurality of filter units, wherein a first filter unit made of electrostatically charged fibrous material is utilized at the inlet side of the air filter. The first filter unit has a comparatively greater porosity than the remaining filter units and attracts and removes toner particles charged with an opposite polarity to that of electrostatically charged fibrous material in the first filter unit. Therefore, the air, with a substantial part of toner dust removed, can more easily enter into the remaining filter units for removal of smoke, resulting in increased useful life of the air filter.

SUMMARY OF THE INVENTION

In accordance with one aspect of the present invention, there is provided a filter for use in a printing machine for trapping contaminants from a stream of air passing therethrough. The filter includes a support member defining an aperture therethrough for the passage of the stream of air. The support member has a cross section in a plane perpendicular to the flow of the stream of air. The cross section has an oblong shape and includes a longitudinal axis and a transverse axis. The filter further includes an air permeable member supported by the support member. The air permeable member defines a opening therein for receiving the stream of air. The filter further includes a reinforcement connected to the air permeable member. The reinforcement extends along the air permeable member in the direction of the stream of air. The reinforcement is positioned with respect to the support member so as to shape the air permeable member so that the opening may be sufficiently large to efficiently receive the stream of air.

Pursuant to another aspect of the present invention, there is provided a customer replaceable unit for use in a printing machine. The customer replaceable unit includes a filter for trapping contaminants from a stream of air passing therethrough. The filter includes a support member defining an aperture therethrough for the passage of the stream of air. The support member has a cross section in a plane perpendicular to the flow of the stream of air. The cross section has an oblong shape and includes a longitudinal axis and a transverse axis. The filter further includes an air permeable member supported by the support member. The air permeable member defines a opening therein for receiving the stream of air. The filter further includes a reinforcement connected to the air permeable member. The reinforcement extends along the air permeable member in the direction of the stream of air. The reinforcement is positioned with respect to the support member so as to shape the air permeable member so that the opening may be sufficiently large to efficiently receive the stream of air.

Pursuant to yet another aspect of the present invention, there is provided an electrophotographic printing machine of the type including a customer replaceable unit. The customer replaceable unit includes a filter for trapping contaminants from a stream of air passing therethrough. The filter includes a support member defining an aperture therethrough for the passage of the stream of air. The support member has a cross section in a plane perpendicular to the flow of the stream of air. The cross section has an oblong shape and includes a longitudinal axis and a transverse axis. The filter further includes an air permeable member supported by the support member. The air permeable member defines a opening therein for receiving the stream of air. The filter further includes a reinforcement connected to the air permeable member. The reinforcement extends along the air permeable member in the direction of the stream of air. The reinforcement is positioned with respect to the support member so as to shape the air permeable member so that the opening may be sufficiently large to efficiently receive the stream of air.

BRIEF DESCRIPTION OF THE DRAWINGS

Other features of the present invention will become apparent as the following description proceeds and upon reference to the drawings, in which.

DETAILED DESCRIPTION OF THE PREFERRED EMBODIMENTS

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention.

Figure 6:
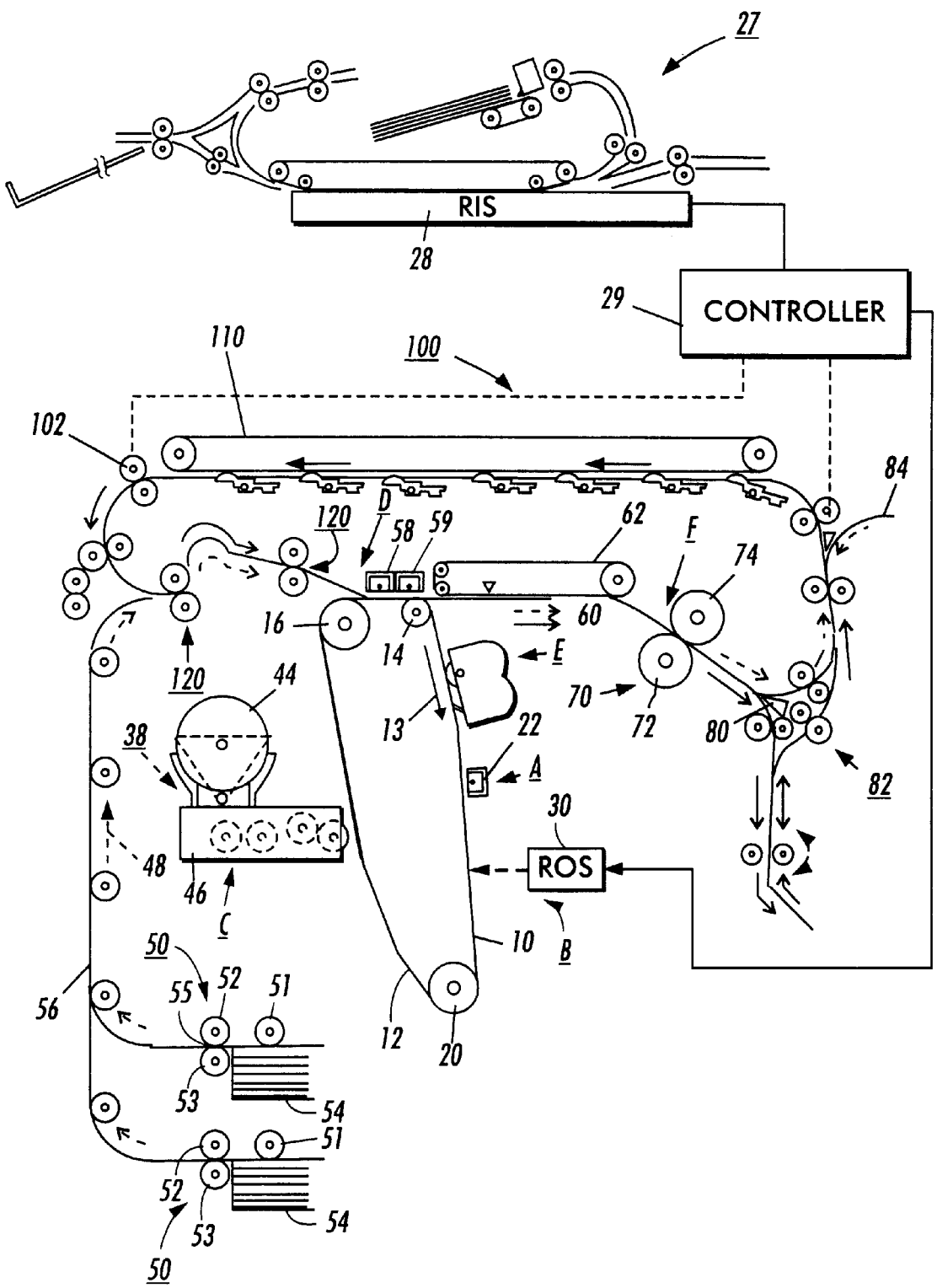
FIG. 6 is a schematic elevational view of a typical electrophotographic printing machine utilizing the multifunction customer replaceable unit latch of the present invention.

For a general understanding of the features of the present invention, reference is made to the drawings. In the drawings, like reference numerals have been used throughout to identify identical elements. FIG. 6 schematically depicts an electrophotographic printing machine incorporating the features of the present invention therein. It will become evident from the following discussion that the present invention may be employed in a wide variety of devices and is not specifically limited in its application to the particular embodiment depicted herein.

Referring to FIG. 6 of the drawings, an original document is positioned in a document handler 27 on a raster input scanner (RIS) indicated generally by reference numeral 28. The RIS contains document illumination lamps, optics, a mechanical scanning drive and a charge coupled device (CCD) array. The RIS captures the entire original document and converts it to a series of raster scan lines. This information is transmitted to an electronic subsystem (ESS) which controls a raster output scanner (ROS) described below.

FIG. 6 schematically illustrates an electrophotographic printing machine which generally employs a photoconductive belt 10. Preferably, the photoconductive belt 10 is made from a photoconductive material coated on a ground layer, which, in turn, is coated on an anti-curl backing layer. Belt 10 moves in the direction of arrow 13 to advance successive portions sequentially through the various processing stations disposed about the path of movement thereof. Belt 10 is entrained about stripping roller 14, tensioning roller 16 and drive roller 20. As roller 20 rotates, it advances belt 10 in the direction of arrow 13.

Initially, a portion of the photoconductive surface passes through charging station A. At charging station A, a corona generating device indicated generally by the reference numeral 22 charges the photoconductive belt 10 to a relatively high, substantially uniform potential.

At an exposure station, B, a controller or electronic subsystem (ESS), indicated generally by reference numeral 29, receives the image signals representing the desired output image and processes these signals to convert them to a continuous tone or greyscale rendition of the image which is transmitted to a modulated output generator, for example the raster output scanner (ROS), indicated generally by reference numeral 30. Preferably, ESS 29 is a self-contained, dedicated minicomputer. The image signals transmitted to ESS 29 may originate from a RIS as described above or from a computer, thereby enabling the electrophotographic printing machine to serve as a remotely located printer for one or more computers. Alternatively, the printer may serve as a dedicated printer for a high-speed computer. The signals from ESS 29, corresponding to the continuous tone image desired to be reproduced by the printing machine, are transmitted to ROS 30. ROS 30 includes a laser with rotating polygon mirror blocks. The ROS will expose the photoconductive belt to record an electrostatic latent image thereon corresponding to the continuous tone image received from ESS 29. As an alternative, ROS 30 may employ a linear array of light emitting diodes (LEDs) arranged to illuminate the charged portion of photoconductive belt 10 on a raster-by-raster basis.

After the electrostatic latent image has been recorded on photoconductive surface 12, belt 10 advances the latent image to a development station, C, where toner, in the form of liquid or dry particles, is electrostatically attracted to the latent image using commonly known techniques. The latent image attracts toner particles from the carrier granules forming a toner powder image thereon. As successive electrostatic latent images are developed, toner particles are depleted from the developer material. A toner particle dispenser, indicated generally by the reference numeral 44, dispenses toner particles into developer housing 46 of developer unit 38.

With continued reference to FIG. 6, after the electrostatic latent image is developed, the toner powder image present on belt 10 advances to transfer station D. A print sheet 48 is advanced to the transfer station, D, by a sheet feeding apparatus, 50. Preferably, sheet feeding apparatus 50 includes a nudger roll 51 which feeds the uppermost sheet of stack 54 to nip 55 formed by feed roll 52 and retard roll 53. Feed roll 52 rotates to advance the sheet from stack 54 into vertical transport 56. Vertical transport 56 directs the advancing sheet 48 of support material into the registration transport 120 of the invention herein, described in detail below, past image transfer station D to receive an image from photoreceptor belt 10 in a timed sequence so that the toner powder image formed thereon contacts the advancing sheet 48 at transfer station D. Transfer station D includes a corona generating device 58 which sprays ions onto the back side of sheet 48. This attracts the toner powder image from photoconductive surface 12 to sheet 48. The sheet is then detacked from the photoreceptor by corona generating device 59 which sprays oppositely charged ions onto the back side of sheet 48 to assist in removing the sheet from the photoreceptor. After transfer, sheet 48 continues to move in the direction of arrow 60 by way of belt transport 62 which advances sheet 48 to fusing station F.

Fusing station F includes a fuser assembly indicated generally by the reference numeral 70 which permanently affixes the transferred toner powder image to the copy sheet. Preferably, fuser assembly 70 includes a heated fuser roller 72 and a pressure roller 74 with the powder image on the copy sheet contacting fuser roller 72. The pressure roller is cammed against the fuser roller to provide the necessary pressure to fix the toner powder image to the copy sheet. The fuser roll is internally heated by a quartz lamp (not shown). Release agent, stored in a reservoir (not shown), is pumped to a metering roll (not shown). A trim blade (not shown) trims off the excess release agent. The release agent transfers to a donor roll (not shown) and then to the fuser roll 72.

The sheet then passes through fuser 70 where the image is permanently fixed or fused to the sheet. After passing through fuser 70, a gate 80 either allows the sheet to move directly via output 84 to a finisher or stacker, or deflects the sheet into the duplex path 100, specifically, first into single sheet inverter 82 here. That is, if the sheet is either a simplex sheet, or a completed duplex sheet having both side one and side two images formed thereon, the sheet will be conveyed via gate 80 directly to output 84. However, if the sheet is being duplexed and is then only printed with a side one image, the gate 80 will be positioned to deflect that sheet into the inverter 82 and into the duplex loop path 100, where that sheet will be inverted and then fed to acceleration nip 102 and belt transports 110, for recirculation back through transfer station D and fuser 70 for receiving and permanently fixing the side two image to the backside of that duplex sheet, before it exits via exit path 84.

After the print sheet is separated from photoconductive surface 12 of belt 10, the residual toner/developer and paper fiber particles adhering to photoconductive surface 12 are removed therefrom at cleaning station E. Cleaning station E includes a rotatably mounted fibrous brush in contact with photoconductive surface 12 to disturb and remove paper fibers and a cleaning blade to remove the non-transferred toner particles. The blade may be configured in either a wiper or doctor position depending on the application. Subsequent to cleaning, a discharge lamp (not shown) floods photoconductive surface 12 with light to dissipate any residual electrostatic charge remaining thereon prior to the charging thereof for the next successive imaging cycle.

The various machine functions are regulated by controller 29. The controller is preferably a programmable microprocessor which controls all of the machine functions hereinbefore described. The controller provides a comparison count of the copy sheets, the number of documents being recirculated, the number of copy sheets selected by the operator, time delays, jam corrections, etc. The control of all of the exemplary systems heretofore described may be accomplished by conventional control switch inputs from the printing machine consoles selected by the operator. Conventional sheet path sensors or switches may be utilized to keep track of the position of the document and the copy sheets.

Figure 5:
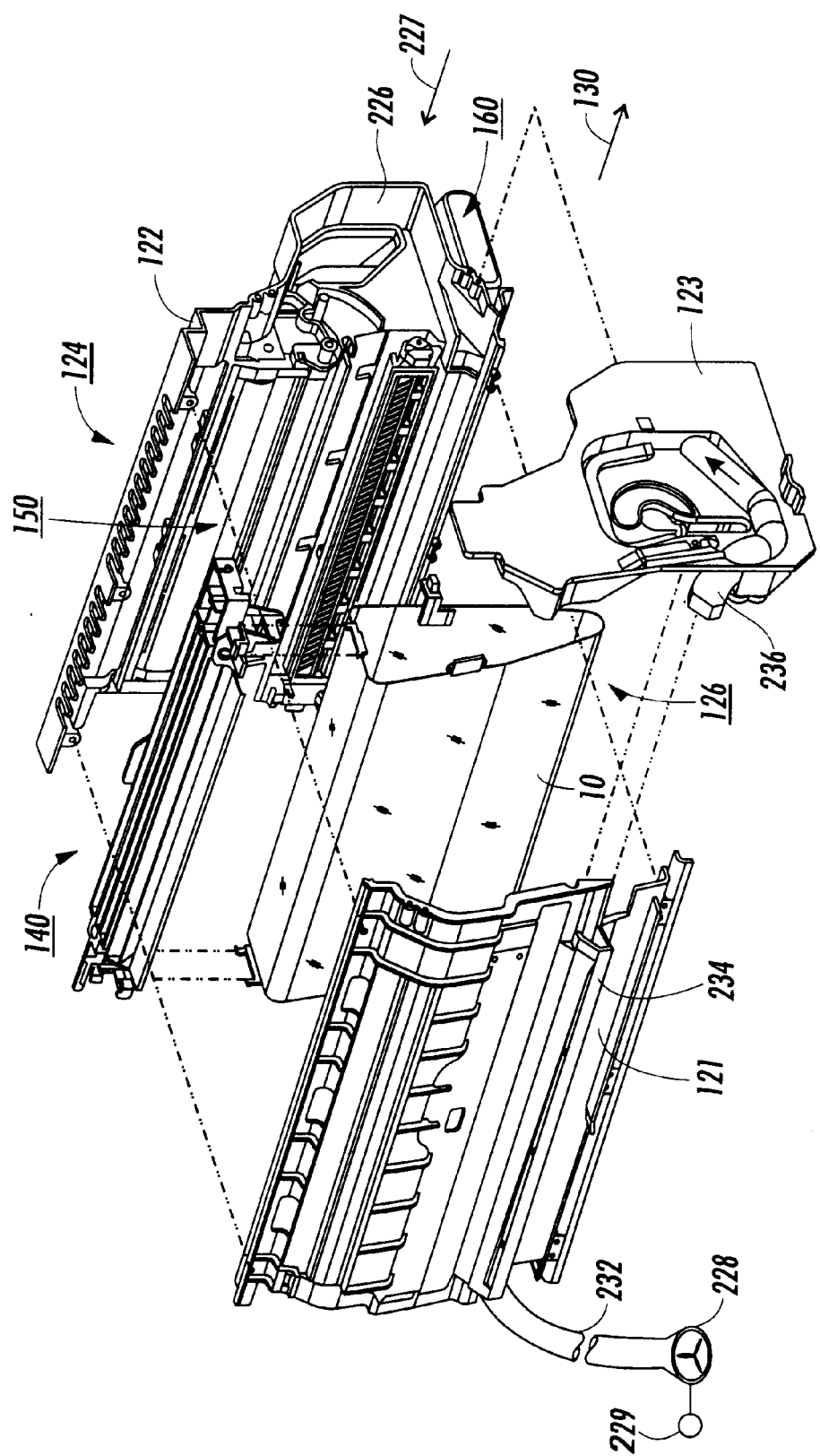
FIG. 5 is an exploded perspective view of a customer replaceable unit for use in the printing machine of FIG. 6.

Turning next to FIG. 5, there is illustrated a perspective view of xerographic CRU 124. The xerographic CRU module mounts and locates xerographic subsystems in relationship to the photoreceptor module and xerographic subsystem interfaces. Components contained within the xerographic CRU include the transfer/detack corona generating devices, the pretransfer paper baffles, the photoreceptor cleaner, the charge scorotron, the erase lamp, the photoreceptor (photoreceptor) belt, the noise, ozone, heat and dirt (NOHAD) handling manifolds and filter, the waste bottle, the drawer connector, CRUM, the automatic cleaner blade engagement/retraction and automatic waste door open/close device.

A summary of the xerographic CRU components and the function of each is as follows:

Cleaner (Doctor blade and Disturber Brush): remove untransferred toner from the photoreceptor; transport waste toner and other debris to a waste bottle for storage; assist in controlling the buildup of paper talc, filming and comets on the photoreceptor belt.

Precharge Erase Lamp: provides front irradiation of the photoreceptor to the erase the electrostatic field on the surface Charge Pin Scorotron: provides a uniform charge level to the photoreceptor belt in preparation for imaging.

Photoreceptor Belt: charge retentive surface advances the latent image portions of the belt sequentially through various xerographic processing stations which converts electrostatic field on the surface.

Pretransfer Paper Baffles: directs and controls tangency point between the paper and photoreceptor surface. Creates an "S" bend in paper to flatten sheet in the transfer zone.

Transfer Wire Corotron: places a charge on the paper as in passes under the corotron. The high positive charge on the paper causes the negative charged toner to transfer from the photoreceptor to the paper.

Detack Pin Corotron: assist in removing paper with its image from the photoreceptor by neutralizing electrostatic fields which may hold a sheet of paper to photoreceptor. Sheet self strips as it passes over a stripper roll on belt module.

NOHAD Dirt Manifolds and Filter: removes airborne toner dirt and contaminates from the moving air before it leaves the CRU. The captured toner and contaminates are deposited in a dirt filter contained in the xerographic CRU.

Electrical Drawer Connector: provides connector interface for the CRUM; provides input/output for machine control.

CRUM Chip: allows machine to send reorder message (user interface or automatically) for CRU or other; method to monitor number of copies purchased by the customer and warrantee the CRU for premature CRU failures; provides handshake feature with machine to ensure correct CRU installed in compatible machine; shuts down machine at the appropriate CRU kill point; enables market differentiation; enables CRU life cycle planning for remanufacture; enables remote diagnostics; provides safety interlock for the ROS.

ROS and Developer Interface: provides a developer interface window to allow transfer of toner for imaging from developer donor roll to photoreceptor belt surface latent image; also provides critical parameter mounting and location link which ties ROS to photoreceptor module to ensure proper imaging and eliminate motion quality issues.

BTAC Sensor Interface: provides interface window to monitor process controls.

Registration Transport Interface: provides outboard critical parameter location and mounting feature.

Prefuser Transport Interface: provides critical parameter location and mounting feature.

The CRU subsystems are contained within the xerographic housing. The housing consist of three main components which include the front end cap 123, right side housing 122 and left side housing 121. The xerographic housing is a mechanical and electrical link. It establishes critical parameters by mounting and locating subsystems internal and external to the CRU in relationship to the photoreceptor module and other xerographic subsystem interfaces. The housing allows easy reliable install and removal of the xerographic system with out damage or difficulty.

The front end cap joins the right and left side housings together on the outboard end of the CRU. The front end cap also functions as a mechanical link with features which mount and locate on the outboard of the machine the photoreceptor module, ROS and registration transport in relationship to one another in order to achieve mechanical critical parameters. The end cap also mounts spring loaded slide, waste door pivot and blade pivot links which allows the customer to simultaneously engage and disengage the cleaner waste door and blade during install and removal of the CRU when the photoreceptor module handle is rotated. When removed from the machine, the blade pivot link insures the cleaner blade remains retracted to prevent photoreceptor belt and blade damage during CRU install and removal. The waste door pivot link secures the cleaner waste bottle door closed when the CRU is removal to prevent spillage of toner during shipping. The end cap also mounts a dirt manifold which links the left side housing developer manifold with the NOHAD dirt filter in the right side housing. The manifolds transport airborne toner and other contaminates to the dirt filter by means of an airflow stream.

The right side housing mounts and locates a number of the xerographic subsystems and interfaces internal and external to the CRU. The right side housing mounts one half of the transfer and detack assembly, charge scorotron, photoreceptor belt and drawer connector. These components are allow to float within the CRU housing. They achieve critical parameter locations with the photoreceptor module and machine frame when the CRU housing is fully installed and the photoreceptor module handle engages the tension roll. Both the charge scorotron and transfer/detack subsystem are located by means of spring loads located on the photoreceptor module.

The right side housing also contains molded scorotron retention features and mounts and locates a charge spring which retracts the charge scorotron subsystem to the housing when the CRU is removed from the machine. The spring enables successful install and removal of the CRU without damage to the charge scorotron.

The right side housing has molded ports in the charge scorotron mounting area to allow non-contaminated air to flow over the charge device in order to remove any contaminates which would affect the performance of the unit. i.e. (nitrous oxide is a cause of parking deletions).

The right side housing features molded vents at the transfer/detack location. The vents also allow sufficient air over the transfer and detack devices to prevent any nitrous oxide contamination.

The housing has special molded features which mount and locate the cleaner assembly, precharge erase lamp, waste bottle and NOHAD air duct and filter. The right housing mounts and locates the interfaces of the cleaner blade and waste door pivot features. The housing positions the NOHAD air duct and filter to the blower to allow sufficient airflow to capture airborne contaminates and toner.

The photoreceptor belt 10 is partially retained by molded fingers with are located on the inboard and outboard areas of the right housing. Other retaining belt fingers are located on the transfer detack housing and left side housing. The housing has a molded feature at the lower outboard end which positions the belt on the photoreceptor module 126 to prevent belt damage.

The left side housing serves as protective cover for the photoreceptor belt and provide interface windows with various subsystems surrounding the CRU. The interface windows include the BTAC, developer and ROS. The housing also mounts one half of the transfer detack subsystem. It also provides an interface window with the registration transport for the entry of paper. The developer dirt manifold is also mounted and located on the left side housing. Two of the belt retaining fingers and a molded feature at the lower outboard end retain and position the photoreceptor belt during install and removal. The left side housing has a molded baffle which covers ROS on outboard end to prevent customer exposure to the ROS beam.

The integrated CRU housing ramps the registration transport and prefuser transport into position when the unit is installed in the machine. The CRU housing makes 22 critical mechanical and electrical interfaces almost simultaneously. All the housings possess double bosses which allows the unit to be secured together during the manufacturing build. If both bosses happen to strip out over time, a longer screw can be used to secure the parts due to sufficiently deep bosses.

Referring again to FIG. 5, a xerographic CRU 124 is shown. The xerographic CRU 124 surrounds photoreceptor module 126. The CRU 124 is installed and removed from the printing machine by motion in the direction of arrow 130 normal to the view as shown in FIG. 1.

Figure 1:
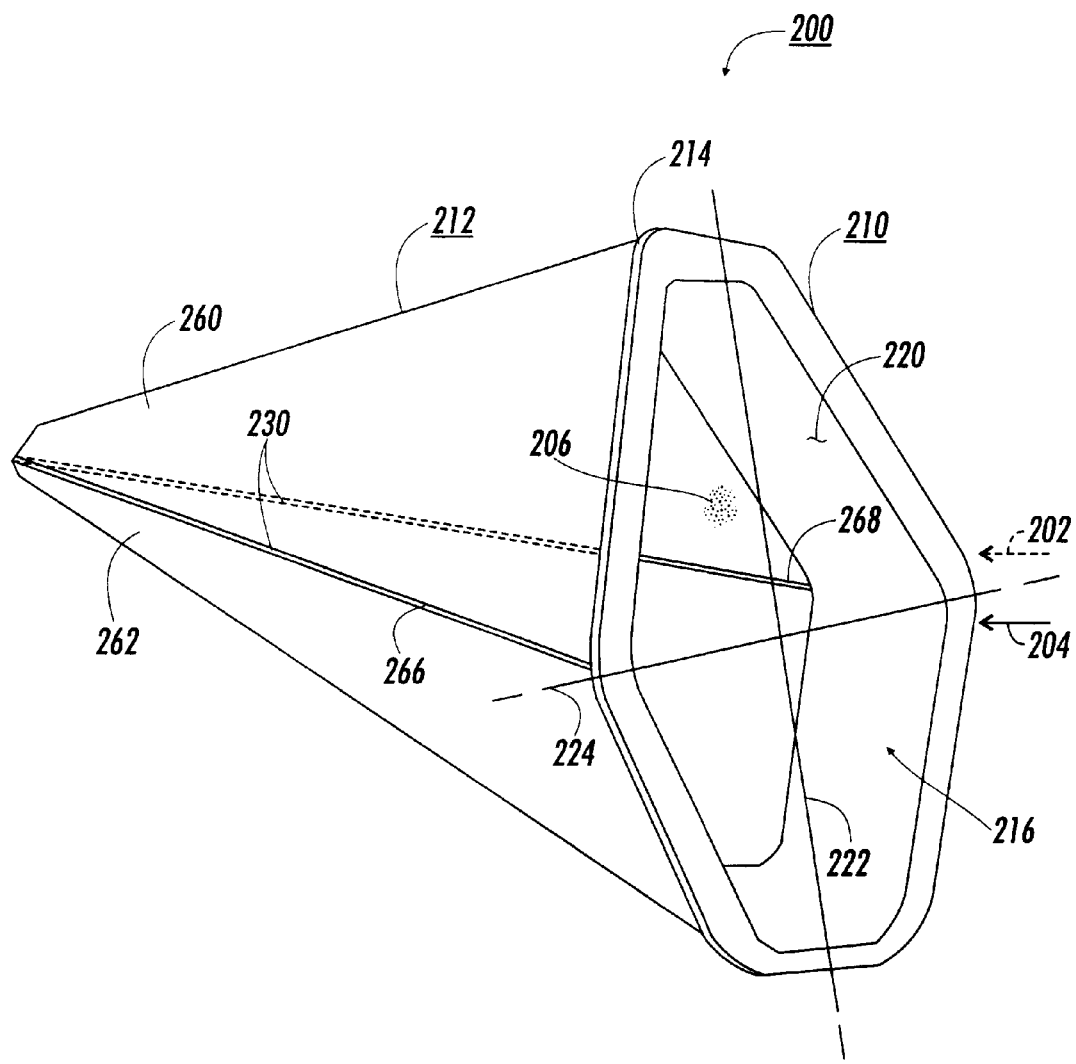
FIG. 1 is an elevational view partially in cross section of a customer replaceable unit for use in the FIG. 6 printing machine showing the filter of the present invention.

According to the present invention and referring to FIG. 1, an improved reinforced filter is shown as filter 200. The filter 200 is positioned in a stream 202 of air flowing in the direction of arrow 204. The filter 200 serves to trap contaminants 206 which are airborne within the stream 202 of air. The contaminants 206 may include any airborne particle. Marking particles in the form of toner and other contamination removed from the photoconductor belt 10 (see FIG. 6) are typical particles collected by the filter 200.

Referring again to FIG. 1, the filter 200 includes a support member 210 in the form of a collar. The collar 210 is used to secure an air permeable member 212 thereto. The air permeable member 212 serves as the filter element for the filter 200. The air permeable member 212 is secured to the support member 210 at first end 214 of the air permeable member 212. The support member 210 provides support for the air permeable member 212 such that the stream 202 of air flowing in the direction of arrow 204 may enter an aperture 216 formed in the air permeable member 212.

The support member 210 has a cross section 220 in a plane perpendicular to the flow of the stream 202 of air in the direction of arrow 204. The cross section 220 has an oblong shape which is defined by a longitudinal axis 222 and a transverse axis 224 which is perpendicular to longitudinal axis 222. A reinforcement 230 is connected to the air permeable member 212. The reinforcement 230 extends along the air permeable member 212 in the direction 204 of the stream 202 of air. The reinforcement 230 is positioned with respect to the support member 210 so that the reinforcement 230 serves to shape the air permeable member 212 in order that the aperture 216 may be sufficiently large so as to efficiently receive the stream 202 of air.

While it should be appreciated that the filter 200 may be positioned anywhere within the printing machine, since the filter 200 must be replaced when clogged with contamination, the filter 200 is preferably positioned so that it may be easily removed by an operator. Preferably, as shown in FIG. 5, the filter 200 is included in a customer replaceable unit (CRU) such as CRU 124. The CRU 124 includes a collection of components which require repeated replacement during the service life of the machine. For example, the CRU 124 includes photoconductive belt 10, charging unit 140, cleaning unit 150, and waste toner unit 160.

The filter 200 is preferably positioned over chamber 226 located in right side housing 122. The chamber 122 receives contaminated air flowing in the direction of arrow 227. The air is directed by fan 228 driven by motor 229. The fan 228 and the motor 229 may be any suitable durable commercially available fan and motor combination. A duct 232 connects the fan 228 to first conduit 234 located in left side housing 121. The first conduit 234 in the left side housing 121 is connected to second conduit 236 located in front end cap 123. Air from the second conduit 236 is directed into chamber 226 of the right side housing 122 thereby providing an air passageway from the fan 228 to the chamber 226.

Figure 4:
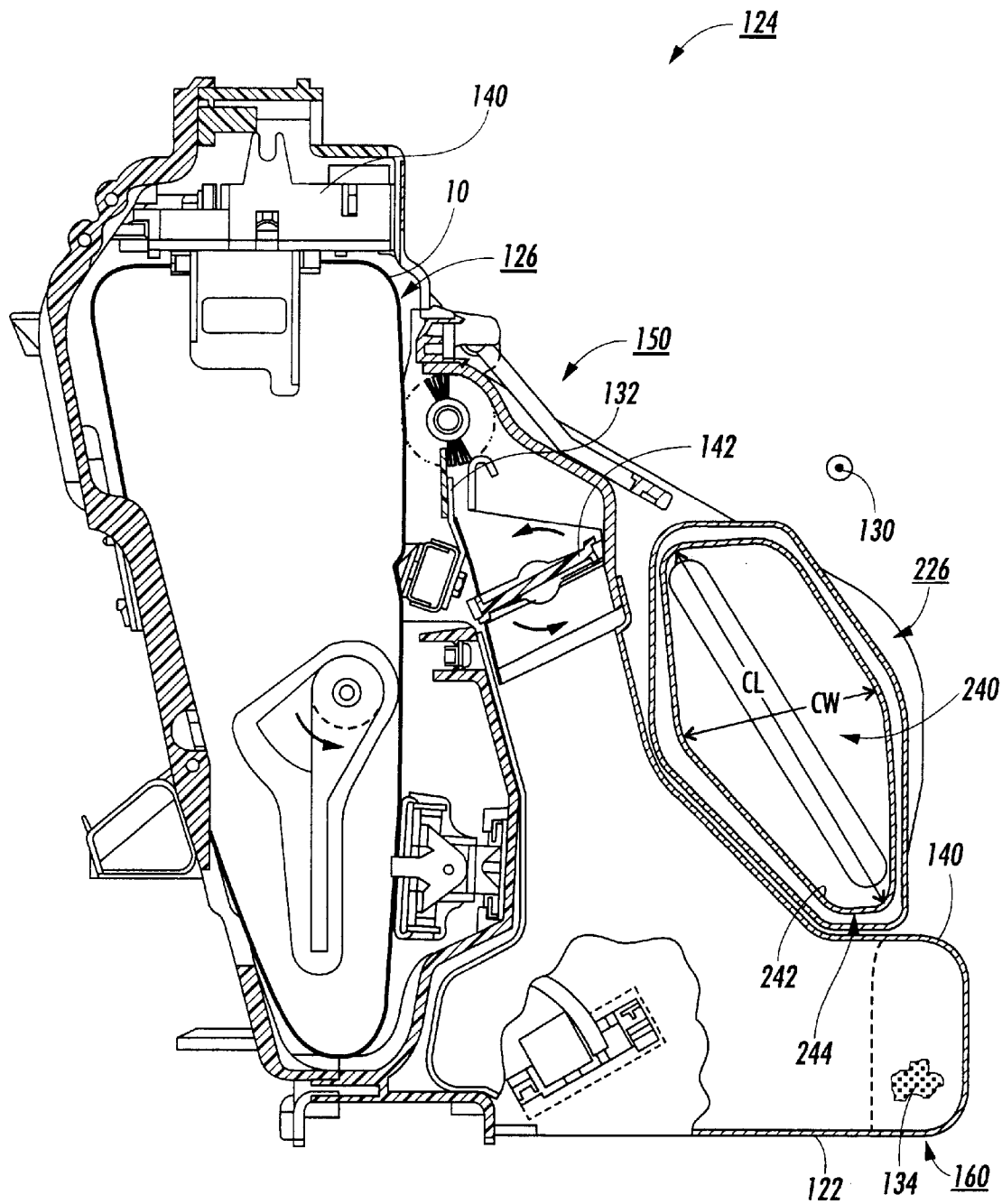
FIG. 4 is a is an elevational view partially in cross section of a customer replaceable unit for use in the FIG. 6 printing machine showing the installation location of the filter in greater detail.

Referring now to FIG. 4, the chamber or filter receptacle 226 is shown in greater detail in the all in one CRU 124. The filter receptacle 226 includes a filter cavity 240 defined by cavity periphery 242 on the right side housing 122. The cavity periphery 242 defines a cavity width CW which is substantially smaller than the cavity length CL. The filter 200 assembles to the filter receptacle 226 by fitting against the cavity periphery 242 and receptacle face 244.

Figure 2:
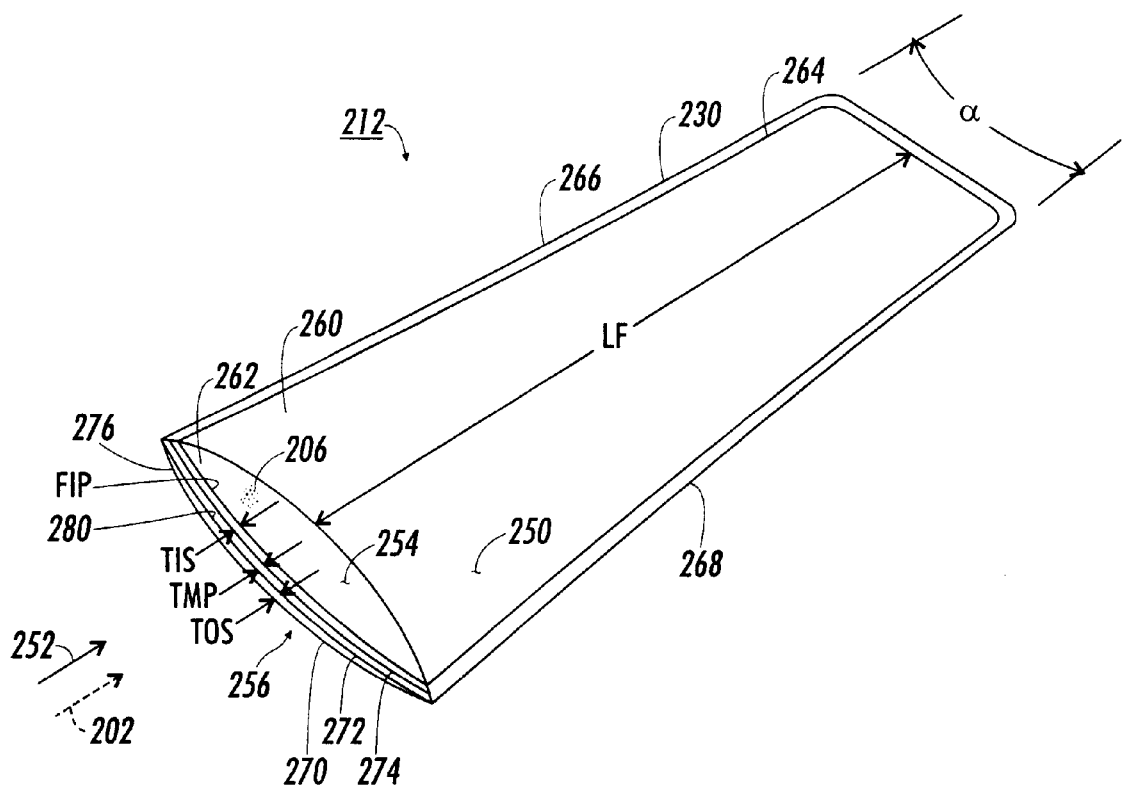
FIG. 2 is a perspective view of a filter for use in the customer replaceable unit of the FIG. 6 printing machine.

Referring now to FIG. 2, the air permeable member 212 is shown in greater detail. The air permeable member includes an air permeable wall 250 through which the stream 202 of air flows in the direction of arrow 252, whereby the stream 202 flows through wall 250 thereby trapping the contaminants 206 along inner surface 254 of wall 250. Porous wall 250 is preferably formed into a vessel including an opening 256 therein. Air flows in the direction of arrow 252 into opening 256. Air within the opening 256 passes through the wall 250.

The air permeable member 212 may have any suitable shape. Preferably, however, the member 212 has a solitary opening 256 so that contamination within the air flowing in the direction of arrow 252 is trapped within the wall 250 of the member 212. The air permeable member 212 is preferably made of a planar sheet and formed into a shape including an opening 256. When formed from a sheet, the air permeable member 212 needs to be connected about the periphery thereof. It should be appreciated that the air permeable member 212 may be made from a single planar sheet but as shown in FIG. 2, the air permeable member 212 includes a first portion 260 and a second portion 262. Preferably, the first portion 260 and the second portion 262 have a similar shape so that the first portion 260 and the second portion 262 may be connected along the periphery 264 therebetween.

The first portion 260 and second portion 262 may be interconnected by any suitable method. For example, the first portion and second portion may be glued or interconnected by fasteners. Preferably, however, the first portion 260 and the second portion 262 are interconnected by heat sealing the first portion 260 and the second portion 262 to each other along periphery 264. By heat sealing the first portion 260 with the second portion 262, the heat seal portion of the first portion 260 and 262 form a reinforcement 230 therebetween.

The reinforcement 230 serves to strengthen the air permeable member 212 to assist in maintaining a shape such that an opening 256 therein is optimized. When a first portion 260 and the second portion 262 are adjoined the reinforcement 230 includes a first reinforcement portion 266 spaced from a second reinforcement portion 268.

The wall 250 of the air permeable member 212 may have any suitable construction such that contamination 206 may be trapped thereon. The wall 250 may be made of any suitable durable material which is air permeable such as paper or plastic. Preferably, however, the air permeable member is made of a plastic. While the wall 250 of the member 212 may have a solitary layer, preferably the wall 250 includes three layers. The wall 250 includes an outer layer 270, a middle layer 272, and an inner layer 274.

The outer layer 270 may be made of any suitable durable material but preferably is made of polyester. The outer layer 270 may have an outer surface 276 which may be white and an inner surface 280 which may be pink. The outer layer 270 may have any suitable thickness and may be for example have a thickness TOS of 3 ply or approximately 0.05 to 0.10 mm.

The middle portion 272 is positioned inside outer layer 270. The middle portion 272 may be made of any suitable durable material but preferably is made of a plastic. For example, the middle layer 272 may be made of polypropylene. For example, the middle layer may be made of melt blown polypropylene with a density of 8.6 plus or minus one ounce per square yard. The middle portion 272 may have any suitable thickness capable of capturing airborne dust particles of 5 microns or larger while permitting a sufficient flow of air therethrough. For example, the middle portion 272 may have a thickness TPM of 7.1 plus or minus one millimeter.

The inner layer 274 is positioned inside middle layer 272. The inner layer 274 may be made of any suitable durable material but preferably is made of a non-woven polyester. The density of the non-woven polyester may be for example 4.2 oz per square yard. The polyester made be 70 percent at 6 denier and 30 percent at 15 denier. The inner layer 274 may have a thickness TIS of 8.64 mm plus or minus one mm. The material utilized for the air permeable member 212 may be a commercially available material. The air permeable member 212 is preferably flame resistant and meets an Underwriter's Laboratory™ flammability standard of UL 94HF-2.

Figure 3:
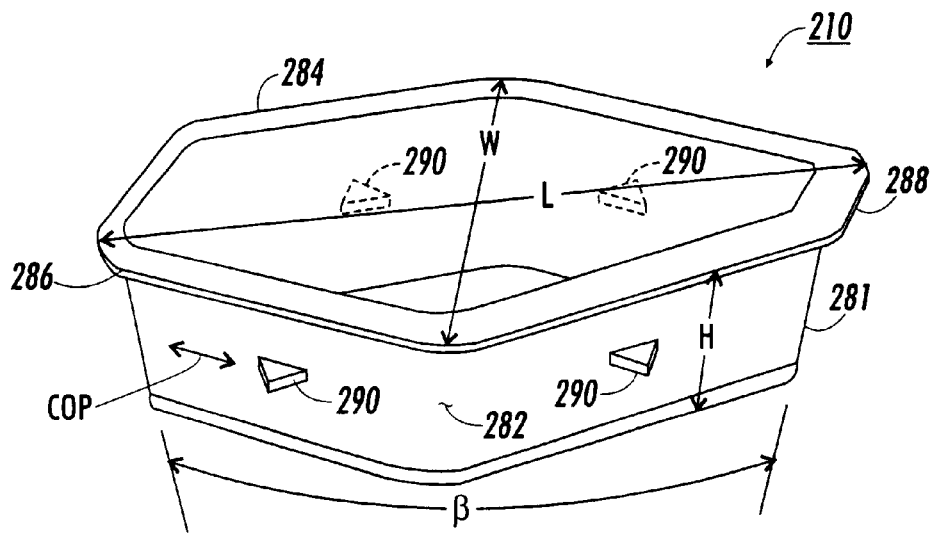
FIG. 3 is perspective view of a collar for mounting the filter into the customer replaceable unit for use in the FIG. 6 printing machine.

Referring now to FIG. 3, collar 210 is shown in greater detail. Collar 210 preferably has an oblong shape which conforms with the filter receptacle 226 of the right side housing 122 of the CRU 124 (see FIG. 4). The collar 210 includes a body 281 which has a tapered collar periphery 282. The collar periphery 282 may, for example, have a taper β of 20 degrees. The collar periphery 282 is matingly fitted to cavity periphery 242 (see FIG. 4) and is fittable thereon.

Referring again to FIG. 3, a collar flange 284 extends along first end 286 of the body 280. The collar flange 284 includes a locating face 288 against which the collar 210 is located against receptacle face 244 of the CRU 124.

The collar 210 has a collar width W which is similar to cavity width CW and a collar length L which is similar to cavity length CL. To permit adequate flow for the recirculating cleaning of a mid volume capacity printing machine, applicants have found that a collar 210 with a length L of approximately 115 mm and a width W of approximately 70 mm is sufficient to provide ample flow through the filter 200. The collar may have a wall thickness T of approximately 1.5 mm and the body 280 may have a height H of 5.5 mm.

The collar 210 may be made of any suitable durable material, i.e. a plastic or a metal. Preferably the collar 210 is made of plastic, i.e. black polystyrene.

The air permeable member 212 may be fitted onto the collar 210 in any suitable fashion. For example, the member 212 may be secured to the collar 210 by means of a fastener or by glue. Preferably, however, the collar 210 includes triangularly shaped tabs 290 which protrude from body 280 of the collar 210. The tabs 290 are equally spaced about the collar periphery 282 and while a single tab 290 may be used, preferably, a quantity of four equally spaced apart tabs 290 are utilized. The tabs 290 are inserted into the wall 250 of the air permeable member 212 and serve to secure the member 212 to the collar 210.

Referring again to FIG. 2, the air permeable member 212 includes an inner periphery perimeter FIP which is similar to perimeter COP of the collar periphery 282. Referring again to FIG. 1, the air permeable member 212 is shown installed onto collar 210. The reinforcement 230 serves to maintain the air permeable member 212 in a shape such that aperture 216 is maximized. While the invention may be practiced with a single reinforcement 230, preferably, when the air permeable member 212 is made from first portion 260 and second portion 262, two reinforcements 230 are utilized including first reinforcement portion 266 and second reinforcement portion 268.

The first and second reinforcement portions 266 and 268 are positioned to optimize the shape of the air permeable member 212 so that an ample flow of air may pass in the direction of arrow 204 through the filter 200. Applicants have found that the rigidity of the air permeable member 212 is optimized when the reinforcements 266 and 268 are positioned closer to the transverse axis 224, than the longitudinal axis 222.

In fact, preferably, the first reinforcement 266 and the second reinforcement 268 are positioned along a plane including the transverse axis 224. Thereby the first portion 266 and the second portion 268 in combination with the support member 212 form a generally triangular structure to maximize the strength of the air permeable member in an opened position so that a sufficient stream of air may pass through the member 212.

By providing a filter for trapping contamination including a reinforcement positioned with respect to a support member to shape the air permeable member so that the opening is large enough to receive the stream of a air, a filter may be provided which is simple, inexpensive, yet has ample rigidity to perform effectively.

By providing a filter for trapping contaminates which includes an air permeable member with an integral reinforcement, a simple, inexpensive and sufficiently rigid filter may be provided.

By providing a filter for trapping contaminates which includes an air permeable member with an integral reinforcement positioned adjacent the open transverse axis of the filter, a rigid, simple filter may be provided.

By providing a filter for removing contaminates which includes a filter media made of a material which may be heat sealed an integral reinforcement may be provided through the heat sealing of the air permeable member.

By providing a filter for removing contaminates including a pair of air permeable members interconnected by heat sealing, an integral reinforcement may be provided to maintain the filter in an open and efficient method.

While the invention herein has been described in the context of black and white photoreceptor CRU, it will be readily apparent that the device can be utilized in electrophotographic printing machine in which ease of service and customer service ability is desired.

It is, therefore, apparent that there has been provided in accordance with the present invention, a CRU module that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the invention.

We claim:

1. A filter for use in a printing machine for trapping contaminants from a stream of air passing therethrough, said filter comprising:

a support member defining an aperture therethrough for the passage of the stream of air therethrough, said support member having a cross section thereof in a plane perpendicular to the flow of the stream of air, said cross section having an oblong shape defining a longitudinal axis thereof and a transverse axis thereof;

an air permeable member supported by said support member, said air permeable member defining an opening therein for receiving the stream of air;

a reinforcement integral with and formed from said air permeable member, said reinforcement extending along said air permeable member in the direction of the stream of air, said reinforcement positioned with respect to said support member so as to shape the opening of said air permeable member to correspond to the aperture of the support member so as to efficiently receive the stream of air.

2. A filter according to claim 1, wherein said reinforcement is positioned closer to the transverse axis than the longitudinal axis.

3. A filter according to claim 2, wherein said reinforcement is aligned with said transverse axis.

4. A filter according to claim 1, wherein said reinforcement is formed from said air permeable member by heat sealing said air permeable member.

5. A filter according to claim 1, wherein at least one of said collar, said reinforcement and said air permeable member comprises a plastic.

6. A filter according to claim 1:

wherein said air permeable member comprises a first portion thereof and a second portion thereof;

wherein said first portion and said second portion are heat sealed together, said first portion and said second portion defining the opening therebetween; and wherein said reinforcement is formed from said air permeable member by the heat sealing of said first portion and said second portion to each other.

7. A filter according to claim 6, wherein the reinforcement is a first reinforcement, and further comprising a second reinforcement formed from said air permeable member by the heat sealing of said first portion and said second portion to each other, said second reinforcement positioned opposed to said first reinforcement.

8. A customer replaceable unit for use in a printing machine, said customer replaceable unit including a filter for trapping contaminants from a stream of air passing therethrough, said filter comprising:

a support member defining an aperture therethrough for the passage of the stream of air therethrough, said support member having a cross section thereof in a plane perpendicular to the flow of the stream of air, said cross section having an oblong shape defining a longitudinal axis thereof and a transverse axis thereof;

an air permeable member supported by said support member, said air permeable member defining an opening therein for receiving the stream of air; and a reinforcement integral with and formed from said air permeable member, said reinforcement extending along said air permeable member in the direction of the stream of air.

9. A customer replaceable unit according to claim 8, wherein said reinforcement is positioned closer to the transverse axis than the longitudinal axis.

10. A customer replaceable unit according to claim 9, wherein said reinforcement is aligned with said transverse axis.

11. A customer replaceable unit according to claim 8, wherein said reinforcement is formed from said air permeable member by heat sealing said air permeable member.

12. A customer replaceable unit according to claim 8, wherein at least one of said collar, said reinforcement and said air permeable member comprises a plastic.

13. A customer replaceable unit according to claim 8, wherein said air permeable member comprises a first portion thereof and a second portion thereof;

Wherein said first portion and said second portion are heat sealed together, said first portion and said second portion defining the opening therebetween; and wherein said reinforcement is formed from said air permeable member by the heat sealing of said first portion and said second portion to each other.

14. A customer replaceable unit according to claim 13, wherein the reinforcement is a first reinforcement, and further comprising a second reinforcement formed from said air permeable member by the heat sealing of said first portion and said second portion to each other, said second reinforcement positioned opposed to said first reinforcement.

15. An electrophotographic printing machine including a customer replaceable unit, said customer replaceable unit including a filter for trapping contaminants from a stream of air passing therethrough, said filter comprising:

a support member defining an aperture therethrough for the passage of the stream of air therethrough, said support member having a cross section thereof in a plane perpendicular to the flow of the stream of air, said cross section having an oblong shape defining a longitudinal axis thereof and a transverse axis thereof;

an air permeable member supported by said support member, said air permeable member defining an opening therein for receiving the stream of air; and a reinforcement integral with and formed from said air permeable member, said reinforcement extending along said air permeable member in the direction of the stream of air.

16. A printing machine according to claim 15, wherein said reinforcement is positioned closer to the transverse axis than the longitudinal axis.

17. A printing machine according to claim 16, wherein said reinforcement is aligned with said transverse axis.

18. A printing machine according to claim 15, wherein said reinforcement is formed from said air permeable member by heat sealing said air permeable member.

19. A printing machine according to claim 15, wherein at least one of said collar, said reinforcement and said air permeable member comprises a plastic.

20. A printing machine according to claim 15:

wherein said air permeable member comprises a first portion thereof and a second portion thereof;

wherein said first portion and said second portion are heat sealed together, said first portion and said second portion defining the opening therebetween; and wherein said reinforcement is formed from said air permeable member by the heat sealing of said first portion and said second portion to each other.

21. A printing machine according to claim 20, wherein the reinforcement is a first reinforcement, and further comprising a second reinforcement formed from said air permeable member by the heat sealing of said first portion and said second portion to each other, said second reinforcement positioned opposed to said first reinforcement.

* * * * *